United States Patent
La Montagne

[15] 3,651,601
[45] Mar. 28, 1972

[54] FLOWER HOLDERS

[72] Inventor: Richard L. La Montagne, 1112 N. Federal Hwy., Boynton Beach, Fla. 33435

[22] Filed: July 31, 1970

[21] Appl. No.: 59,920

[52] U.S. Cl..........................................................47/41.12
[51] Int. Cl..............................................................A47g 7/02
[58] Field of Search.........................................47/41–41.13; 161/21, 26–30

[56] References Cited

UNITED STATES PATENTS

| 117,965 | 8/1871 | Barrie | 47/41 |
| 3,003,284 | 10/1961 | Smithers | 47/41.12 |
| 3,183,624 | 5/1965 | Swett | 47/41.11 |
| 3,368,303 | 2/1968 | Tong | 47/41.12 |
| 3,576,699 | 4/1971 | Meyer | 47/41 X |

FOREIGN PATENTS OR APPLICATIONS 13,767   1905   Great Britain

*Primary Examiner*—Robert E. Bagwill
*Attorney*—Frank H. Wisch

[57] ABSTRACT

Improvements are set forth in portable flower holders usable for bouquets that are handheld or for stationery decorations. The holder includes a dish or a plurality of interlocked, vertically supportable means for dishes with removable lip means encircling a bouquet arranged in the dish or dishes and for attaching decorative material to enframe a bouquet; spongelike means that is efficiently kept uniformly moist to maintain flowers fresh over a longer period; and a removable funnel-shaped base that is serviceable as a funnel and serviceable in vertically supporting the holder and that is unobtrusively attachable to the holder when the holder is to be held in the hand.

3 Claims, 9 Drawing Figures

Patented March 28, 1972 3,651,601

Patented March 28, 1972 3,651,601

Patented March 28, 1972 3,651,601

FLOWER HOLDERS

The present invention relates to improvements in portable flower holders for floral displays, and more particularly to bouquet or corsage holders that are usable in floral arrangements or displays or held in the hand for various occasions.

An object of the present invention is to provide improvements in means for holding a bouquet in an attractive manner, and means for efficiently maintaining a bouquet properly watered. Another object is to provide improvements in means for including decorations in association with a bouquet. A further object is to provide means by which bouquets are supported at multilevels. Still another object is to provide improvements in means for supporting a single bouquet in decorative arrangement, or a plurality of bouquets each at a separate level in decorative arrangements.

Preferred embodiments of the invention by which the above and other objects are fulfilled, are included by way of example in the accompanying drawings. Modifications and changes in details of construction are comprehended within the scope of the invention as defined in the appended claims.

In the drawings.

The same or similar parts in the various figures in the drawing are designated hereinbelow by similar numerals.

Figure 3:
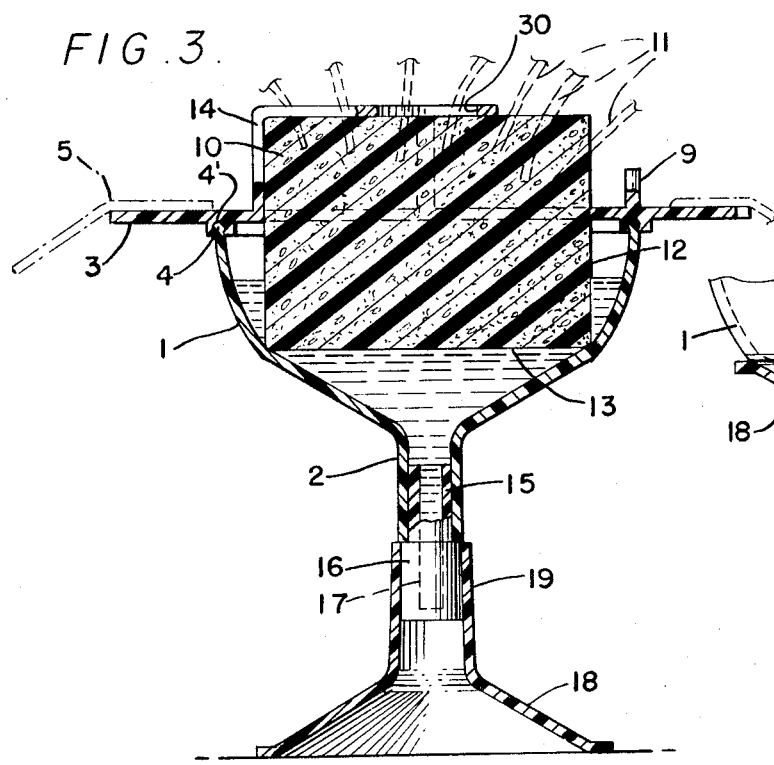
FIG. 3 is a vertical sectional view of the holder shown in FIG. 1 taken on line 3–3 of FIG. 2.

Referring to FIG. 3 in the drawings, a shallow container such as a bowl or dish 1 is shown with a hollow, cylindrical stem 2 connected to an opening in the bottom of the said dish. A detachable annular lip 3 extends outwardly from the edge 4 of the dish. Any suitable means for connecting the lip 3 to the edge 4 may be employed, as for instance, one somewhat similar to a ball and socket arrangement in which the slightly widened edge 4 of the dish snaps into a narrow depression or channel 4' on the under side of the lip 3 the said edge and channel being substantially circular in cross section.

Figure 1:
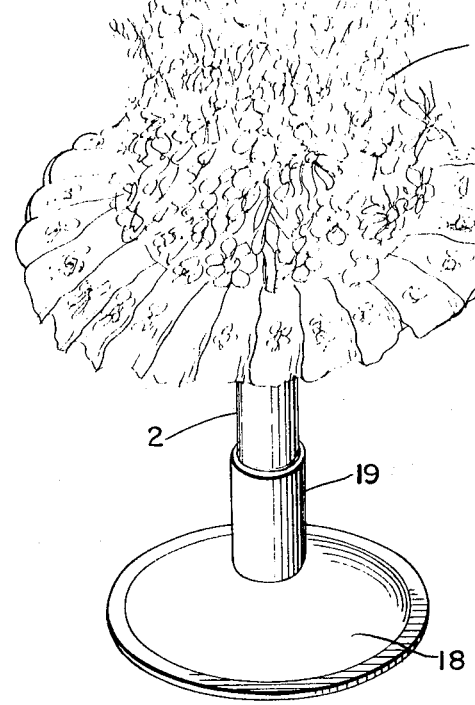
FIG. 1 is a perspective view showing a bouquet in a holder with a decorative doily.
Figure 2:
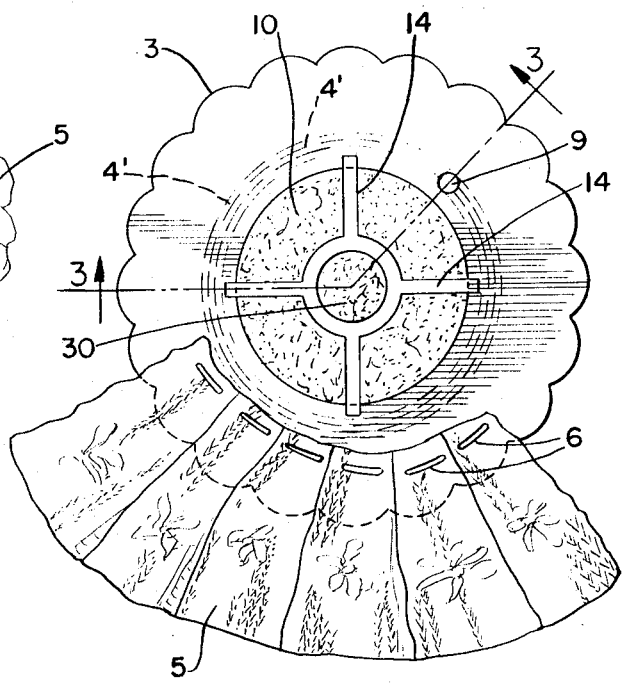
FIG. 2 is a top plan view of the holder showing a fragment of a decorative doily and illustrating means for attaching and placing it.

The lip 3 serves mainly as a means for attaching decorative material to enframe or encircle a bouquet 8, shown in FIG. 1. Decorative plastic or cloth sheets or a doily 5, for instance in annular arrangement and pleated if desired, are attached to the lip by staples or other means. Staples 6 can be readily used when the lip is made of plastic for instance. A short vertical solid post 9 attached rigidly and vertically to the lip may be included as a stay to attach a cascade or decorative hangings.

A block of moisture-retentive, spongelike material 10 penetrable by stems of flowers 11 and for holding them in position, is placed in the dish 1. Various types of materials including all types of foamed resin material are suitable water absorbents and serve to keep the flowers fresh and continuously moist.

The block 10 is preferably spaced from the bottom and side of the dish 1. The maximum surface area of the block of spongelike material is thus brought into contact with water in the dish, which results in maintaining the block more uniformly moist throughout its bulk. An example of an arrangement for accomplishing this, is illustrated in FIG. 3 in which the dish 1 is shown with a concave or depressed bottom or the bottom of the dish slopes downwardly from the side of the dish to the opening in the bottom of the dish to which the tubular stem 2 is connected. With a cylindrical block of smaller diameter than that of the dish the cylindrical side surface 12 is spaced from the sidewall of the dish 1, and substantially only the edge of the bottom flat surface 13 of the block 10 rests on, and is in contact with the lower inner surface of the dish.

Retaining strips 14, preferably flat and elongated, are attached to the annular lip member 3 and extend over the top of the dish 1 in a manner which serves to maintain the block centered an in position in the dish. The strips 14 are spaced as desired to permit penetration of stems 11 of flowers arranged in a bouquet 8 (FIG. 1).

The tubular stem 2 has a lower open end into which a removable plug 15 is inserted. The plug 15 has a head 16 which is of any desired length, and combined with the stem 2 serves as a handle for the bouquet. A tubular passage 17 extends longitudinally through the plug 15 part way into the head 16.

A removable base 18 makes it convenient to use the flower holder as a centerpiece when it is not held in the hand. The base is substantially in the form of a funnel having a cone portion that tapers down to a tubular portion 19. When inverted as shown in FIG. 3, it serves to support the bouquet holder in upright position on a flat surface. In this position, the tubular portion 19 frictionally engages the head 16 of the plug 15. The outer diameter of the stem 2 is only slightly larger than the inner diameter of the tubular portion 19 of the base 18, and the diameter of the cylindrical head 16 of the plug 15 is only slightly larger than the inner diameter of the stem 2 so that the end of the stem 2 serves as a stop and prevents further upward movement of the tubular portion 19.

Figure 4:
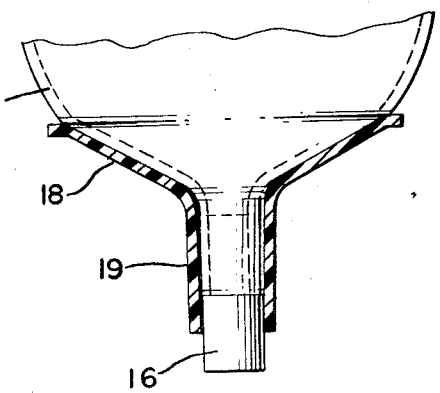
FIG. 4 is a fragmentary side view of the holder illustrating the disposal of the removable base (shown in section) of the holder when not in use.

When the base 18 is not in use, it is attachable to the flower holder in the manner shown in FIG. 4. The stem 2 is inserted in the cone of the funnel which is moved upwardly to the bottom of the dish 1. For this purpose, the outer side of the bottom of the dish has a shape that coincides with the shape of the inner surface of the cone portion of the funnel shaped base 18. The base fits tightly against the dish and the tubular portion 19 slides tightly on the stem 2 and is held in place by friction. This is feasible when material of the base is, for instance, a plastic having a certain degree of flexibility.

Figure 5:
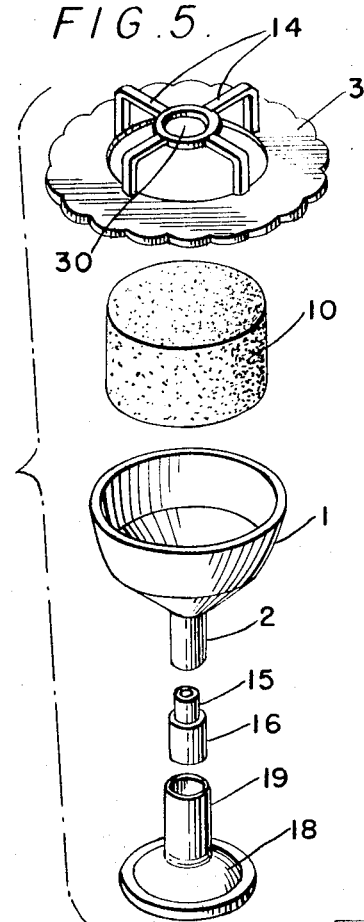
FIG. 5 is an exploded perspective view of an embodiment of the invention shown in FIG. 3.

The manner of assembling the parts of a flower holder shown in FIGS. 1 to 4 is illustrated in FIG. 5. For example, the plug 15 is inserted in the lower end of stem 2 as far as it will go; the head 16 of the plug is inserted in the tubular portion 19 of the base 18 which is moved toward the dish 1 until stopped at the end of the stem 2; the spongelike block 10 is placed in the dish 1; and the lip 3, combined with the retaining strips 14 and applied decorative material 5, is snapped into position and fastened to the edge of the dish 1, the retaining strips 14 passing upwardly on the sides of the block 10 and across the top surface thereof. Water may be poured into the holder before or after the lip and strips are applied. The water enters the passage 17 in the plug 15 from the dish 1 and through the stem 2, and fills the dish 1 to any level above the bottom surface of the block 10. The base 18 may be removed and, if desired, may be used to funnel the water into the holder. After introduction of the water, the holder is ready for the desired floral arrangement, the stems 11 of the flowers being stuck into or through the moist block 10.

When the holder is not used in the manner of a vase or as a centerpiece but held in the hand during receptions or wedding ceremonies, the base 18 is removed and put in the position shown in FIG. 4. The water is removable by pulling out the plug 15. The block 10 after being moistened remains moist sufficiently to keep the flowers fresh over a considerable period of time.

Figure 6:
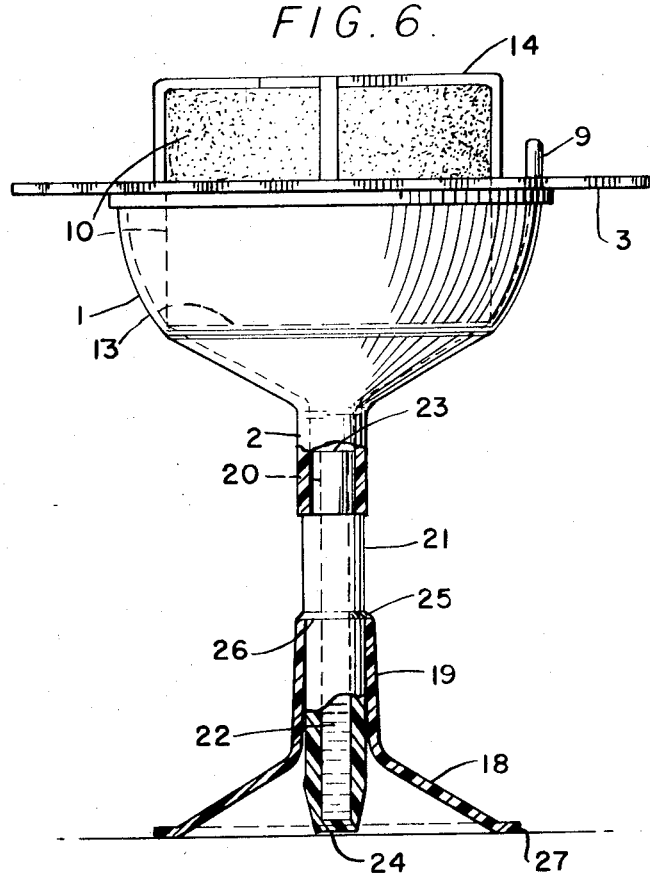
FIGS. 6 and 7 are side elevational views, partly in section, of a modification of the present invention.
Figure 7:
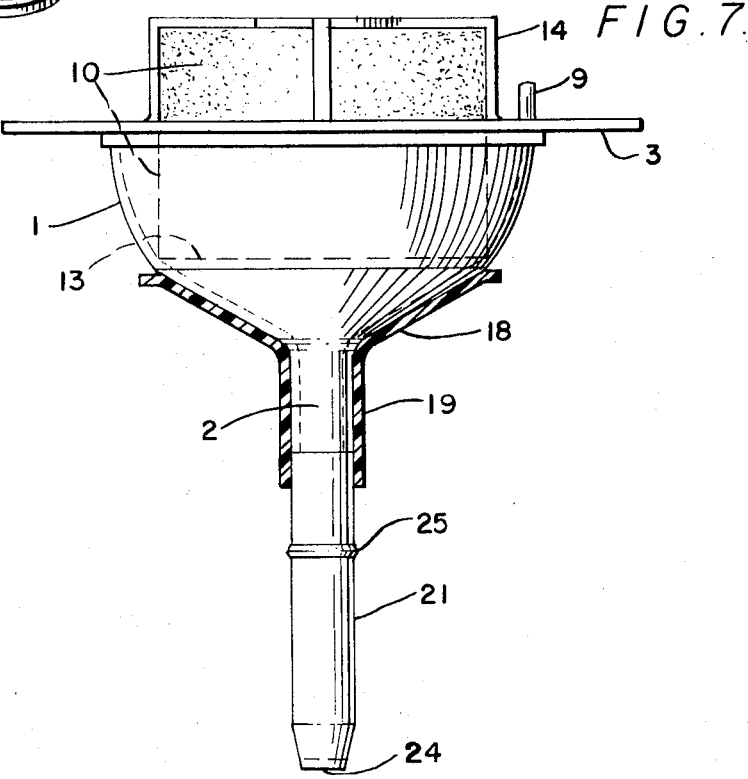

There are instances when a longer handle for the holder is needed, or when it is desirable to place a bouquet at a higher level in a display. In such instances, the part of a plug corresponding to the head portion 16 of the plug shown in FIGS. 3 and 4 may be of various lengths. By way of example, a plug 20 with a long head portion 21, as shown in FIGS. 6 and 7, may be substituted for the shorter plug shown in FIGS. 3 and 4. A passage 22 extends from the open end 23 longitudinally through the plug to the closed end 24. Water introduced in the dish 1 fills the passage 22, and stems of flowers may extend down into this passage.

To keep the base 18 from sliding too far on the head 21 toward the dish 1 when in the position shown in FIG. 6, a ridge 25 is provided on said head. When the holder is used as a vase or centerpiece, for instance, the tubular portion 19 of the base slides upwardly until the end 26 is stopped by the ridge 25. The ridge 25 is placed so that the end 24 of the head 21 does not project beyond the free edge 27 of the cone portion of the base 18. When the holder is to be held in the hand at ceremonies, the base 18 is placed in the position shown in FIG. 7 similar to the position shown in FIG. 4. The ridge 25 projects sufficiently to serve as a stop as shown in FIG. 6 but in view of the slight flexibility of the material in the base, the tubular portion 19 can be moved across the ridge 25 to be placed in the position shown in FIG. 7. The frictional engagement of the tubular portion 19 with the stem 2 of the holder keeps the base 18 from moving down by the force of gravity.

Figures 8, 9:
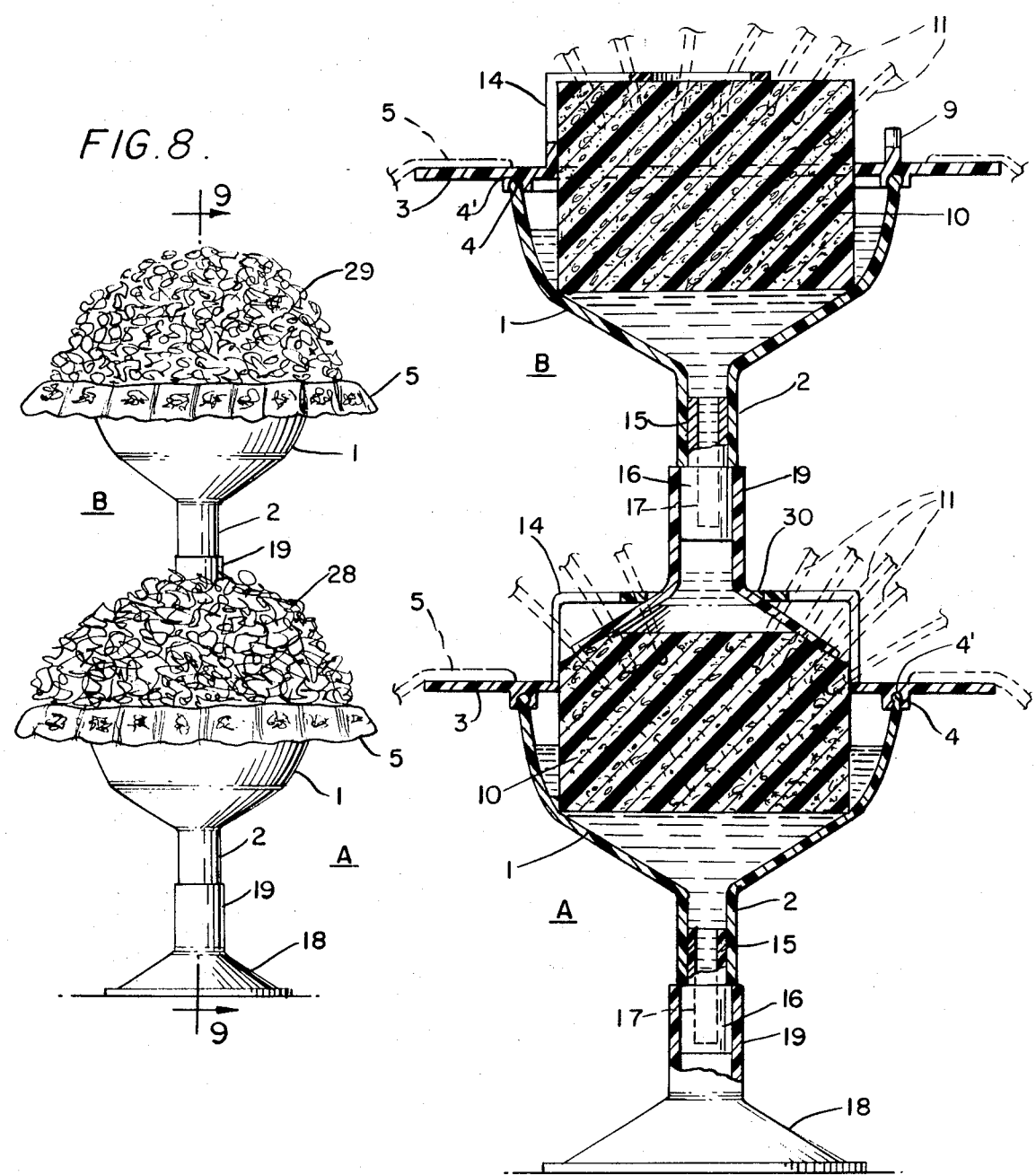
FIG. 8 is a front view of a modification.
FIG. 9 is a vertical section taken on line 9–9 of FIG. 8.

So-called double topiary colonials and arrangements are shown in FIGS. 8 and 9, in which bouquets 28 and 29 with the same or different floral arrangements are on two levels in holders similar in construction to that shown in FIG. 3. The holder at each level includes a dish 1 with a tubular stem 2; a detachable annular lip 3 attachable to the edge 4 of the dish; a doily 5 attached to the lip 3; a block 10 of moisture retentive, spongelike material in the dish 1 positioned to expose its sides and bottom to water in the dish; means 14 for retaining the block 10 in the dish and yet making it possible to insert stems of flowers in said block; a plug 15 with a head 16 in the lower end of the stem 2; a removable base 18 attached to the head 16.

A procedure for providing the aforementioned double colonial arrangement shown in FIGS. 8 and 9 with two flower holders such as that shown in FIGS. 1 to 5, is as follows: Referring to FIGS. 3 and 9 before including the flowers, the lip-3-and-retaining-strips-14 combination is removed from the holder A that is to be on the lower level. The stand or base 18 on the holder B to be used on the upper level is removed. The tubular portion 19 of the stand is passed through a central opening 30 (FIGS. 2 and 9) formed by the retaining strips 14 of the above holder A. The plugged end of the stem 2 of holder B is inserted in the end of the tube 19 to attach it to the latter stand. If desired, the plug with the shorter head 16 may be replaced by one with the longer head 21 (FIGS. 6 and 7). The base 18 of the holder B is then placed on top of the block 10 to be used in the dish 1 of holder A. The last-mentioned retaining strips 14 are brought down on the upper surface of the base 18 of holder B, and the lip 3 attached to said strips is snapped into place on the dish of holder A. The base 18 is thereby clamped between the retaining strips 14 and the block 10 of holder A, thereby maintaining holder B in upright position above holder A.

If the base 18 of the upper holder B is too large for the space between the retaining strips 14 and the block 10 for the holder A, it may be reduced in size for this purpose. If it is made of plastic, for instance, the rim of the base 18 may be removed with scissors, or the base is otherwise cut to a smaller size.

Water may be introduced in the upper and lower holders before or after assembly. Flowers for the upper and lower holders are arranged as desired, and the stems 11 are pushed into the exposed surfaces of the blocks 10.

Features of the above described bouquet holder are so combined that an artistic article is provided that is highly practical and useful.

What is claimed is:

1. A bouquet holder comprising a dish having a detachable, annular lip extending outwardly from the edge of the said dish; a decorative sheet material selectively attachable and joined to the said lip; a block of moisture-retentive, sponge-like material positioned in the said dish; retaining strips attached to said lip and extending across the top of the said dish for holding the said block in place in the dish; a tubular stem having one end connected to an opening in the bottom of the said dish; a removable plug inserted in the free end of the said tubular stem, the said plug having a cylindrical head extending from the said free end of the said stem; and a funnel-shaped, removable base having a tubular portion slidably and frictionally engaging said head and adapted to be drawn up on said stem by inserting the stem into the cone of the said funnel-shaped base and moving it to the outer side of the bottom of the said dish, the said outer side having substantially a shape that coincides with the shape of the inner surface of the said cone of the said funnel-shaped base.

2. A bouquet holder comprising a dish having a detachable, annular lip extending outwardly from the edge of the said dish; a decorative annular sheet material selectively attachable and joined to the said lip; a block of moisture-retentive, sponge-like material positioned in the said dish, the said block having its bottom and lateral surfaces respectively spaced from the bottom and sides of the said dish whereby the area of contact between water placed in the dish and the said block is maximized, retaining strips attached to said lip and extending across the top of the said dish for holding the said block in place in the dish; a tubular stem having one end connected to an opening in the bottom of said dish; a removable plug inserted in the free end of the said tubular stem; and a removable, inverted funnel-shaped base slidably attached to the said stem and adapted to support the said bouquet holder in upright position.

3. A means for a floral arrangement comprising a plurality of bouquet holders, each of said holders comprising substantially a dish having a detachable, annular lip extending outwardly from the edge of the said dish; a decorative sheet material selectively attachable and joined to the said lip; a block of moisture-retentive, sponge-like material positioned in the said dish; retaining strips attached to said lip and extending across the top of the said dish for holding the said block in place in the dish; a tubular stem having one end connected to an opening in the bottom of the said dish; a removable plug inserted in the free end of the said tubular stem; and a removable, inverted funnel-shaped base slidably attached to the said stem and adapted to support the said bouquet holder in upright position, a said bouquet holder positioned and supported on a level above a holder on an adjacent lower level, and the said holder on the upper level having its base clamped between the said moisture-retentive block and the said retaining strips of the bouquet holder next beneath the said bouquet holder on said upper level.

* * * * *